US012234743B2

(12) United States Patent
Krueckels et al.

(10) Patent No.: US 12,234,743 B2
(45) Date of Patent: Feb. 25, 2025

(54) METHOD FOR MANUFACTURING A BLADE FOR A GAS TURBINE, TURBINE BLADE AND GAS TURBINE

(71) Applicant: DOOSAN ENERBILITY CO., LTD., Changwon-si (KR)

(72) Inventors: Joerg Krueckels, Baden (CH); Ulrich Rathmann, Baden (CH); Willy Hofmann, Baden (CH); Herbert Brandl, Baden (CH)

(73) Assignee: Doosan Enerbility Co., Ltd., Changwon-si (KR)

( * ) Notice: Subject to any disclaimer, the term of this patent is extended or adjusted under 35 U.S.C. 154(b) by 4 days.

(21) Appl. No.: 18/522,215

(22) Filed: Nov. 28, 2023

(65) Prior Publication Data

US 2024/0360766 A1 Oct. 31, 2024

(30) Foreign Application Priority Data

Apr. 27, 2023 (EP) .................................... 23170273

(51) Int. Cl.
*F01D 5/18* (2006.01)

(52) U.S. Cl.
CPC .......... *F01D 5/187* (2013.01); *F05D 2230/21* (2013.01)

(58) Field of Classification Search
CPC .......... F01D 5/187; F01D 5/186; F01D 5/147; F01D 5/18; F01D 9/041; F01D 5/188; F01D 9/065; F05D 2230/21; F05D 2260/204; F05D 2260/202
See application file for complete search history.

(56) References Cited

U.S. PATENT DOCUMENTS

| | | | | |
|---|---|---|---|---|
| 5,348,446 | A * | 9/1994 | Lee | F01D 5/187 29/889.721 |
| 6,974,308 | B2 | 12/2005 | Halfmann et al. | |
| 8,366,392 | B1 * | 2/2013 | Liang | F01D 5/147 416/96 A |
| 9,828,915 | B2 * | 11/2017 | Miranda | B23P 15/04 |
| 2015/0096305 | A1 | 4/2015 | Morgan et al. | |
| 2015/0251376 | A1 * | 9/2015 | Zhang | B32B 3/12 156/290 |
| 2016/0363054 | A1 * | 12/2016 | Miranda | F02C 7/18 |
| 2018/0112547 | A1 | 4/2018 | Snider et al. | |
| 2022/0220858 | A1 | 7/2022 | Hafner et al. | |

FOREIGN PATENT DOCUMENTS

| | | | |
|---|---|---|---|
| EP | 3106619 | A1 | 12/2016 |
| GB | 791751 | A | 3/1958 |

OTHER PUBLICATIONS

European Patent Search Report in Corresponding European Application No. 23170273.9-1004 Dated Sep. 15, 2023, 10 Pages.

* cited by examiner

*Primary Examiner* — Courtney D Heinle
*Assistant Examiner* — Andrew Thanh Bui
(74) *Attorney, Agent, or Firm* — Shook, Hardy & Bacon L.L.P.

(57) ABSTRACT

A method for manufacturing a blade for a gas turbine includes forming a blade body, forming a groove in an outer surface of the blade body, positioning a cover on the blade body such that it covers the groove and such that an outer surface of the cover forms a continuous surface with the outer surface of the blade body, and joining the cover to the blade body so that the cover and the groove define a cooling channel.

19 Claims, 10 Drawing Sheets

Detail Z:

X1-X1:

METHOD FOR MANUFACTURING A BLADE FOR A GAS TURBINE, TURBINE BLADE AND GAS TURBINE

CROSS-REFERENCE TO RELATED APPLICATION

This application claims priority to European Patent Application No. 23170273.9, filed on Apr. 27, 2023, the disclosure of which is incorporated herein by reference in its entirety.

BACKGROUND

Technical Field

The present invention relates to a method for manufacturing a blade for a gas turbine, to a blade for a gas turbine, and to a gas turbine.

Related Art

Blades of gas turbines, in particular, blades in a turbine part of the gas turbine, are subject to high thermal loads. Therefore, it is common to cool the blades by means of a cooling fluid, such as compressed air delivered by a compressor of the gas turbine. The cooling fluid, typically, is conducted to an interior cavity of the blade and, from there, distributed to various cooling channels.

Document U.S. Pat. No. 6,974,308 B2 discloses a turbine blade manufactured in a casting process. The turbine blade includes an airfoil that is formed with an outer wall, wherein the outer wall includes an outer surface defining a suction side and a pressure side, and an inner surface that defines a cavity. A plurality of cooling channels is formed within the massive material between the inner and outer surface of the airfoil.

To improve heat transfer between the cooling fluid flowing in the cooling channels, it would be desirable to reduce a wall thickness between the outer surface of the blade and the cooling channel. However, manufacturing tolerances of typical casting processes limit the minimum possible wall thickness.

SUMMARY

It is one of the objects of the present invention to provide improved solutions for cooling a blade of a gas turbine. In particular, it is an object to provide a blade with a cooling channel that can be manufactured with reduced wall thickness more reliably.

To this end, the present invention provides a method for manufacturing a blade for a gas turbine in accordance with claim 1, a blade in accordance with claim 14, and a gas turbine in accordance with claim 15.

According to a first aspect of the invention, a method for manufacturing a blade for a gas turbine includes forming a blade body, forming a groove in an outer surface of the blade body, positioning a cover on the blade body such that it covers the groove and such that an outer surface of the cover forms a continuous surface with the outer surface of the blade body, and joining the cover to the blade body so that the cover and the groove define a cooling channel.

According to a second aspect of the invention, a blade for a gas turbine includes a blade body having an outer surface in which a groove is formed, and a cover positioned such that it covers the groove and such that an outer surface of the cover forms a continuous surface with the outer surface of the blade body, wherein the cover is joined to the blade body, and wherein the cover and the groove define a cooling channel. The blade according to this aspect of the invention, for example, may be manufactured using the method according to the first aspect of the invention.

According to a third aspect of the invention, a gas turbine includes a blade according to the second aspect of the invention.

It is one of the ideas of the present invention to form a blade body with an open groove at its outer surface, first, and to subsequently join a cover to the blade body that covers the groove so that a cooling channel is limited by the walls of the groove and the cover. The groove may comprise a bottom and opposing sidewalls extending between the bottom of the groove and the outer surface of the blade body. The cover, which may, for example, be generally strip shaped, is positioned on the blade body so that it covers the groove and so that its outer surface is flush or substantially flush with the outer surface of the blade body. For example, the cover may be positioned, at least partially, within the groove, in particular, so that it protrudes into the groove, while its outer surface and the outer surface of the blade form a continuous surface. In this context, a "continuous surface" is not limited to a perfectly flush arrangement of the outer surface of the cover and the outer surface of the blade body but also includes configurations, in which the outer surface of the cover slightly protrudes over the outer surface of the blade body, e.g., by a height being smaller than 5% of a wall thickness of the cover.

The cooling channel limited by the walls or wall surfaces of the groove and an inner surface of the cover has a closed circumference, e.g., a rectangular or substantially rectangular circumference. Since the groove is formed as an open groove, tolerance based limits related to a minimum possible wall thickness are avoided. The thickness of the cover, i.e. a distance between an inner surface and the outer surface of the cover, can be dimensioned according to the actual heat transfer needs, since the cover is manufactured as a separate component and joined subsequently to the blade body.

Hence, heat transfer between a cooling fluid flowing in the cooling channel and an outer surface of the blade can be improved. This results in various benefits. In particular, thermal stress within the wall of the blade is reduced due to a lower temperature difference across the wall resulting from the lower wall thickness. Accordingly, lifetime of the blade is increased. Further, due to the increased heat transfer between the cooling fluid flowing in the cooling channel and the outer surface of the blade, a mass flow of the cooling fluid necessary to achieve a given heat transfer rate can be reduced. Thereby, the overall efficiency of the gas turbine is increased.

Since the cover is a separate part that is subsequently joined to the blade body, the freedom in design to adjust cooling to the actual needs, e.g., to locally high heat loads, is increased. Further, replacing the cover, e.g., in a repairing process, is eased.

Within the scope of the present invention, the term "blade" is intended to cover both, a rotating blade, which may be coupled, for example, to a rotating disk of the gas turbine, and a stationary vane, which may be coupled, for example, to a stator frame of the gas turbine.

Further embodiments of the present disclosure are subject of the further subclaims and the following description, referring to the drawings.

According to some embodiments, the blade body may be formed to include an airfoil extending along a radial direction and a platform protruding along a circumferential direction from a platform end of the airfoil, wherein an outer surface of the airfoil and an outer surface of the platform form the outer surface of the blade body. Optionally, the blade body may be formed to additionally include a root protruding from the platform in the radial direction on a side opposite to the airfoil. The root, for example, may have a firtree shaped cross-section, and, generally, is configured to couple the blade to a rotor disk or to a frame, e.g. in case of a vane.

According to some embodiments, the airfoil may be formed to extend in a chord or axial direction between a leading edge and a trailing edge, wherein a pressure side surface and a suction side surface of the airfoil meet at the leading and the trailing edge, and wherein the groove is formed in at least one of the pressure side surface and the suction side surface adjacent to the trailing edge. That is, a cooling channel formed beneath the outer surface of the airfoil is formed in a region very close to the trailing edge. "Adjacent to the trailing edge" may be understood as a distance, at each radial position of the airfoil, from the physical end of the airfoil formed by the trailing edge, the distance being in a range between 1% and 20% of a total length of the airfoil in the chord direction at the respective radial position. The total length of the airfoil in the chord direction, in this context, may be defined as a length of a skeleton line connecting the leading and the trailing edge and being equally distanced to each of the pressure and the suction side surface. Since the cooling channel is formed by joining the cover to the airfoil having the groove, it is easier to place the cooling channel closer to the trailing edge, compared to forming the cooling channel exclusively in a casting process. In particular, airfoils with a small wedge angle at the trailing edge can easier be realized. For example, the airfoil may be formed with a wedge angle at the trailing edge in a range between 7° and 17°.

According to some embodiments, forming the blade body may include casting the blade body. For example, a conventionally cast (CC), a directionally solidified (DS), or single crystal (SX) cast process may be carried out to form the blade body.

According to some embodiments, the groove may be formed in the step of forming the blade body. For example, the grooves may be formed during the casting process. In other words, the blade body may be formed to already include the grooves. Optionally, the grooves may additionally be treated after forming the blade body, e.g. a surface treatment of the walls of the groove may be carried out, which may, for example, include at least one of grinding, die sinking, or similar. One advantage of forming the groove within the forming process of the blade body is that the process time can be reduced. Further, as the groove opens to the outer surface of the blade body, it is easy to integrate the step of forming the grooves in a casting process.

According to some embodiments, the groove may also be formed by applying an subtractive manufacturing process, such as grinding, die sinking, etching or similar, to the outer surface of the blade body after forming the blade body. Hence, the blade body can be formed first, e.g., in a casting process, and the groove is formed subsequently by an subtractive method. This provides the benefit that the forming step of the blade body can be further eased. Additionally, subtractive processes can be carried out very precisely and with low manufacturing tolerances.

According to some embodiments, the blade body may be formed to have an inner surface defining an inner cavity or void, wherein a wall thickness of the blade body is measured from the inner surface to the outer surface of the blade body. The inner cavity or void may, for example, extend within the airfoil and/or within a root of the blade body and is configured to receive a gaseous cooling fluid, such as compressed air. The wall thickness may be defined on each point of the inner and outer surface of the blade body as a shortest distance between the inner and the outer surface at the respective point.

According to some embodiments, the wall thickness may be within a range between 1.5 and 4 times, optionally between 1.5 and 2 times, of a depth of the groove measured from the outer surface of the blade body to a bottom of the groove. Hence, a ratio W/h, where "W" is the wall thickness and "h" is the depth of the groove, may be within a range of 1.5 to 4, in particular, between 1.5 and 2.

According to some embodiments, the method may further include forming a fluid passage extending between the cavity and the groove. The inner cavity or void, hence, may be formed to be in fluid communication with the groove. For example, the blade body may be formed to include a communication channel extending between the groove and the cavity, or a communication hole may be drilled to extend from the groove to the cavity. Of course, multiple fluid passages, e.g., in the form of holes, may be formed in this step.

According to some embodiments, the method may include forming an outlet passage extending between the groove and the outer surface of the blade body. Through the outlet passage, the cooling fluid flowing in the cooling channel can be discharged to the outer surface of the blade body. For example, the outlet passage may be drilled.

According to some embodiments, the groove may be formed with a support defining a support surface being oriented such that a normal vector to the support surface has a component perpendicular to a region of the outer surface of the blade body adjacent to the groove. As already explained above, irrespective of having a support or not, the groove may comprise a bottom and opposing sidewalls extending between the bottom of the groove and the outer surface of the blade body. The support may be integrally formed with at least one of the bottom and one or both of the sidewalls. The support, generally, may be a physical structure or element that includes a surface that is oriented parallel or inclined to the portion of the outer surface that surrounds the groove or extends adjacent to the groove. Hence, a normal vector to the support surface has a component perpendicular to the region of the outer surface of the blade body adjacent to the groove. This allows placing the cover on the support surface, for example, before joining it to the blade body. Thereby, positioning and joining of the cover is eased.

According to some embodiments, the support may be formed by a step in a sidewall of the groove, the support surface connecting two laterally spaced portions of the sidewall. That is, the sidewall may comprise a first portion extending from the bottom and a second portion extending from the outer surface of the blade body, wherein the second portion is spaced to the first portion in a direction perpendicular to the sidewalls, and wherein a step portion with the step surface extends between and connects the first and second portions of the sidewall. A distance between the first portion of the sidewall and the opposing sidewall is smaller than a distance between the second portion of the sidewall and the opposing sidewall. Hence, the second portion is laterally spaced to the first portion. Optionally, the support surface may extend parallel to the region of the outer surface of the blade adjacent to the groove. The step provides the advantage that it reliably and stably supports the cover.

According to some embodiments, the support may be formed by respective end portions of opposing sidewalls of the groove, wherein the support surface is formed by a surface of each sidewall, wherein the surfaces of the sidewalls, at least in the end portions, define a cross-section of the groove that tapers towards a bottom of the groove. The end portions of the sidewalls are opposite to the bottom. In other words, the end portions of the side walls are adjacent to or extend from the outer surface of the blade body. The surfaces of the sidewalls, in the end portions, may, for example, extend tapering towards the bottom of the groove. This may include, for example, that the surfaces of the sidewalls, in the end portions, extend straight or planar, or that they extend with a concave curvature. Also in these configurations, a normal vector to the support surface, which is formed by the surfaces of the sidewalls in their end portions, has a component perpendicular to the region of the outer surface of the blade body adjacent to the groove. This allows placing the cover on the support surface, for example, before joining it to the blade body. Thereby, positioning and joining of the cover is eased. Tapering end portions of the sidewall provides the advantage that they reliably and stably support the cover. Further, they help in centering the cover relative to the groove.

According to some embodiments, the cover may include a spacer protruding from an inner surface of the cover, wherein positioning the cover on the blade body may include introducing the spacer into the groove so that the spacer contacts a bottom or a support surface of the groove to hold the outer surface of the cover in a position in which it forms a continuous surface with the outer surface of the blade body. Additionally or alternatively to the support of the groove, the cover may include a protrusion, e.g. a rib, protruding from its inner surface that faces the bottom of the groove, when the cover is placed on the blade body. The spacer may be contacted to the bottom of the groove or to a support surface provided within one of the sidewalls, e.g., a support surface of a support as described above. The protrusion, thus, serves as a spacer, that defines a distance between the bottom of the support surface and the outer surface of the cover, and that holds the cover in place, for example, during joining.

According to some embodiments, the method may include introducing a spacing structure into the groove, wherein positioning the cover on the blade body includes positioning the cover on the spacing structure so that the spacing structure holds the cover in a position in which the outer surface of the cover forms a continuous surface with the outer surface of the blade body, and thermally or chemically removing the spacing structure after joining the cover to the blade body. The spacing structure, for example, may include stands, ribs, pins or other spacers that are placed in the groove and dimensioned so that they hold the cover in a position in which the outer surface of the cover is substantially flush with the outer surface of the blade body. The spacing structure can be made, for example, from a plastic material, a material including natural fibers, a wax, or similar. After placing the cover on the support structure and joining the cover to the blade body, the support structure is removed thermally or chemically. This may include heating the blade body to a temperature above the melting temperature or combustion point of the support structure and purging the melted or burned structure out of the channel. Alternatively, removing the support structure may include introducing a solvent, e.g., in liquid form, into the channel, wherein the solvent dissolves or liquidates the support structure. The liquid support structure and the solvent are purged out of the channel finally. Using a support structure provides the advantage that the cross-sectional area of the channel can be maximized.

According to some embodiments, the cover may have a thickness in a range between 0.5 mm and 2.0 mm. The thickness may be measured between the inner and the outer surface of the cover. The range of 0.5 mm to 2.0 mm defines a relatively small wall thickness of the cover which allows for good heat transfer. Optionally, the cover may have a thickness in a range between 0.8 mm and 1.2 mm. This range represents a good compromise between mechanical stiffness and heat transfer.

According to some embodiments, joining the cover to the blade body may include positive substance joining, respective material bonding. For example, joining may include brazing, diffusion bonding, or welding the cover and the blade body together. Welding, for example, may include laser welding, arc welding, or electron beam welding.

According to some embodiments, at least one of the groove and an inner surface of the cover is formed with at least one of projections and recesses. Those recesses and/or projections in the inner surface of the cover and/or the surface of the groove increase the effective area available for heat transfer. Hence, heat transfer can be further improved.

According to some embodiments, the blade body may be made of a Nickel or Cobalt based high temperature alloy, such as, e.g., IN792SX, CM247LC, or similar.

According to some embodiments, the cover may be made of a Nickel or Cobalt based high temperature alloy, in particular, an alloy suitable for additive manufacturing. For example, Hastelloy-X, Haynes 230, IN792SX, CM247LC, or similar may be used.

According to some embodiments, the method may include applying a coating to the outer surface of the cover and the outer surface of the blade body. For example, a MCrAlY material or other suitable material as bondcoat may be applied by a low pressure plasma spray (LPPS), an air plasma spray (APS), a vacuum plasma spray (VPS), or high velocity oxy fuel (HVOF) process. The letter "M" in "MCrAlY" is a placeholder for Co, Ni, or NiCo.

According to some embodiments, the method may include applying a topcoat to the coating. For example, a single or multi-layered ceramic, e.g., Yttrium stabilized zirconium (YSZ), may be applied by LPPS. A further method for applying a topcoat would be, for example, APS.

According to some embodiments, the gas turbine may comprise a compressor configured to compress a working fluid, a burner receiving compressed working fluid from the compressor and configured to burn a fuel to heat the working fluid, and a turbine including the turbine blade assembly, wherein the turbine stage is configured to expand the working fluid causing the turbine blade assembly to rotate. Hence, the blade assembly may form part of the turbine. As a working fluid, the compressor may suck air from the environment, and the compressed air may be used for combustion of the fuel in the combustor or burner. As a fuel, liquid fuel, such as kerosene, diesel, ethanol, or similar may be used. Alternatively, gaseous fuel such as natural gas, fermentation gas, hydrogen, or similar can be used.

The features and advantages described herein with respect to one aspect of the invention are also disclosed for the other aspects and vice versa.

With respect to directions and axes, in particular, with respect to directions and axes concerning the extension or expanse of physical structures, within the scope of the present invention, an extent of an axis, a direction, or a structure "along" another axis, direction, or structure includes that said axes, directions, or structures, in particular tangents which result at a particular site of the respective structure, enclose an angle which is smaller than 45 degrees, preferably smaller than 30 degrees and in particular preferable extend parallel to each other.

With respect to directions and axes, in particular with respect to directions and axes concerning the extension or expanse of physical structures, within the scope of the present invention, an extent of an axis, a direction, or a structure “crossways”, “across”, “cross”, or “transversal” to another axis, direction, or structure includes in particular that said axes, directions, or structures, in particular tangents which result at a particular site of the respective structure, enclose an angle which is greater or equal than 45 degrees, preferably greater or equal than 60 degrees, and in particular preferable extend perpendicular to each other.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments, which are specified in the schematic figures of the drawings, in which.

DETAILED DESCRIPTION

Figure 1:
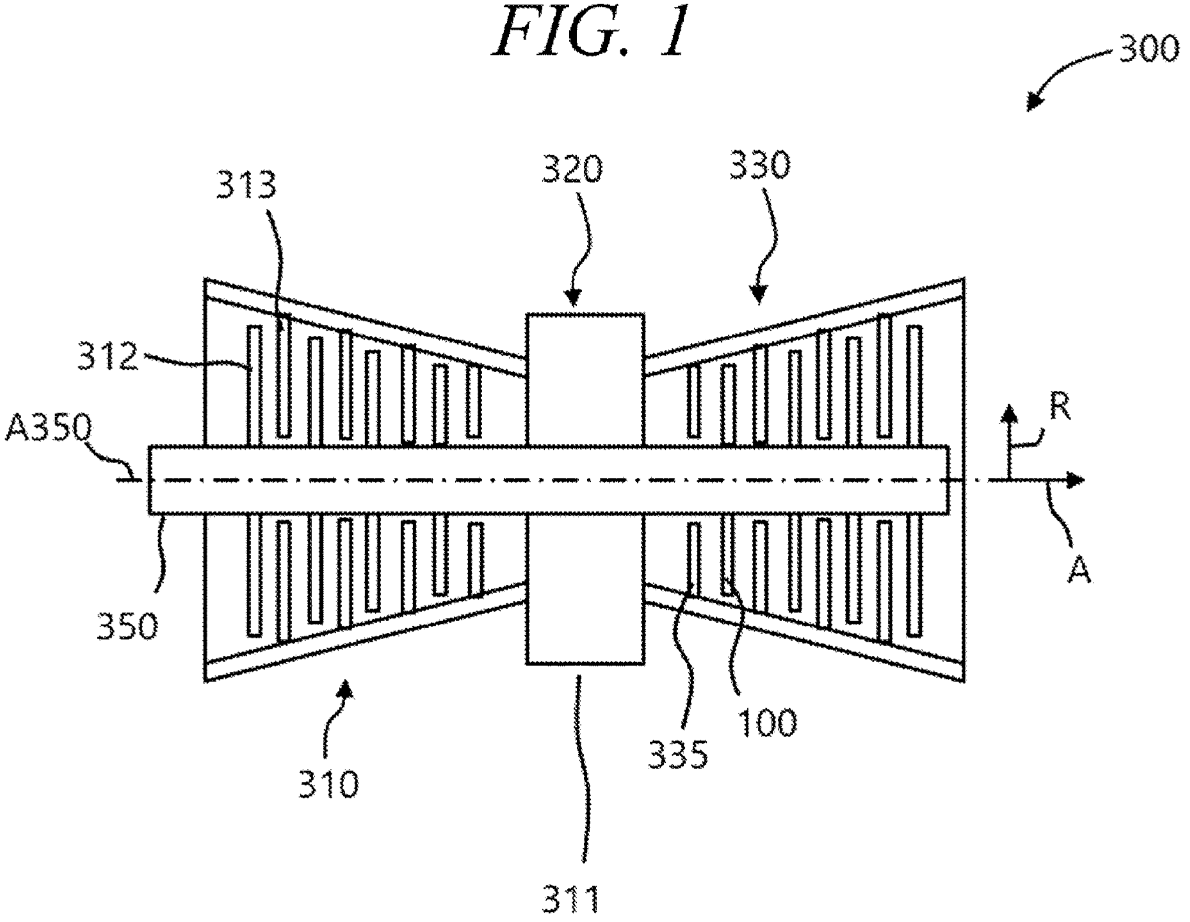
FIG. 1 schematically illustrates a cross-sectional view of a gas turbine according to an embodiment of the invention.

FIG. 1 schematically shows a gas turbine 300. The gas turbine 300 includes a compressor 310, a burner or combustor 320, and a turbine 330. The turbine 330 and the compressor 310 may be mechanically integrated to form a rotor 350 which is rotatable about a common rotational axis A350.

The compressor 310 of the gas turbine 300 may draw air as a working fluid from the environment and compress the drawn air. The compressor 310 may be realized as centrifugal compressor or an axial compressor. FIG. 1 exemplarily shows a multistage axial compressor which is configured for high mass flows of air. The axial compressor may include multiple rotor disks, each carrying a plurality of blades. The rotor disks (not shown) are mounted on the shaft 350 and rotate with the shaft about the rotational axis. Compressor vanes 313 are arranged downstream of the blades 312. The blades 312 compress the introduced air and deliver the compressed air to the compressor vanes 313 disposed adjacently downstream. The plurality of compressor vanes 313 guide the compressed air flowing from compressor blades 312 disposed upstream to compressor blades 312 disposed at a following, downstream stage. The air is compressed gradually to a high pressure while passing through the stages of compressor blades 312 and vanes 313.

The compressed air is supplied to the combustor 320 for combustion of a fuel, such as natural gas, hydrogen, diesel, kerosene, ethanol or similar. Further, a part of the compressed air is supplied as a gaseous cooling fluid to high-temperature regions of the gas turbine 300 for cooling purposes. The burner or combustor 320, by use of the compressed air, burns fuel to heat the compressed air.

Figure 2:
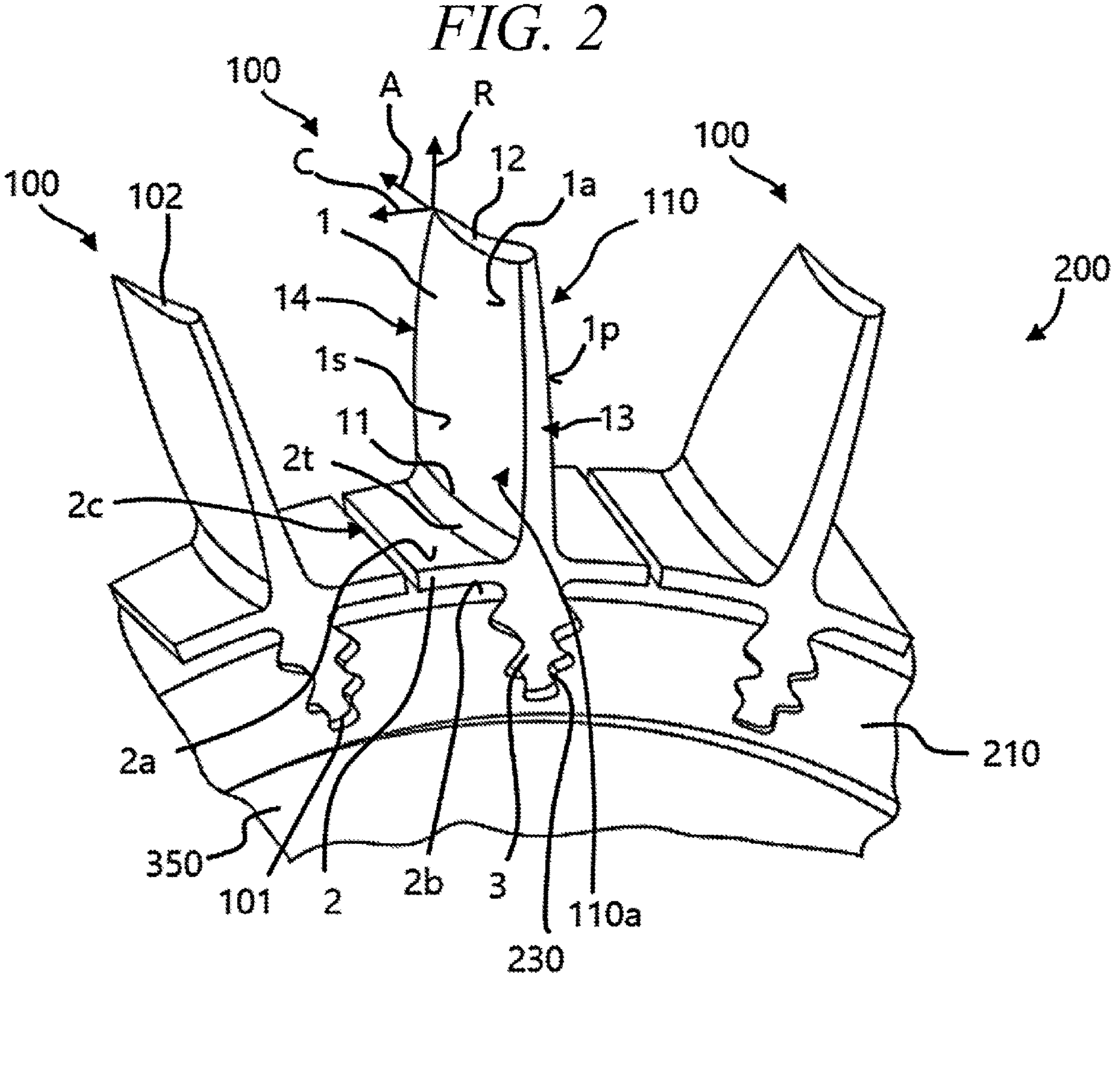
FIG. 2 shows a perspective, partial view of a blade assembly including blades according to an embodiment of the invention.

As schematically shown in FIG. 2, the turbine 330 includes a plurality of blade assemblies 200, each comprising a rotor disk 210 to which a plurality of turbine blades 100 are coupled. The turbine 330 further includes a plurality of turbine vanes 335. FIG. 2 shows a partial view of a blade assembly 200 which will be explained in more detail below. Generally, the rotor disks 210 are coupled to each other so as to be rotatable together about the rotational axis A350. For example, the rotor disks 210 of the turbine and the rotor disks of the compressor may be fastened together by means of a central element such as a bolt to form the rotor 350. The turbine blades 100 are coupled to the respective rotor disk 210 and extend radially therefrom. The turbine vanes 335 are positioned upstream of the blades 100 of the respective rotor disks 210. The turbine vanes are fixed in a stator frame so that they do not rotate about the rotational axis and guide the flow of combustion gas coming from the burner 320 passing through the turbine blades 100. The combustion gas is expanded in the turbine 330 and applies a force to the turbine blades 100 which causes the rotor 350 to rotate about the rotational axis A350. The compressor 310 may be driven by a portion of the power output from the turbine 330.

FIG. 2 shows a blade assembly 200 of the turbine 330. As explained above, the blade assembly includes a rotor disk 210 and a plurality of blades 100.

The rotor disk 210, generally, may have the form of a ring and, at its outer circumference, includes multiple coupling interfaces 230 for coupling the blades 100 to the disk 210. As exemplarily shown in FIG. 2, the coupling interfaces 230 may be formed by grooves. As an example, FIG. 2 shows grooves that have a cross-sectional shape like a firtree.

Figure 3:
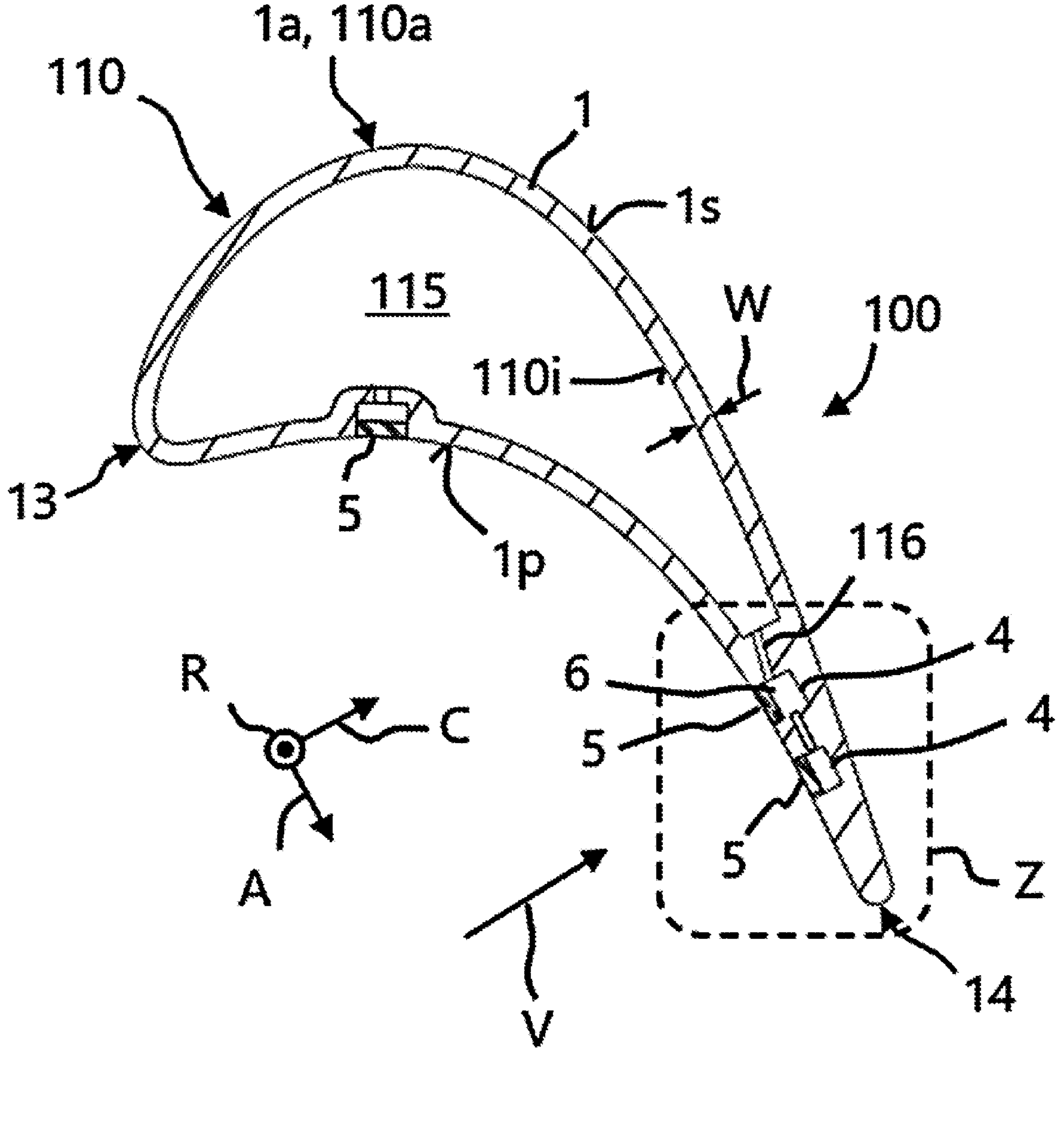
FIG. 3 schematically illustrates a cross-sectional view of a turbine blade according to an embodiment of the invention.
Figure 6:
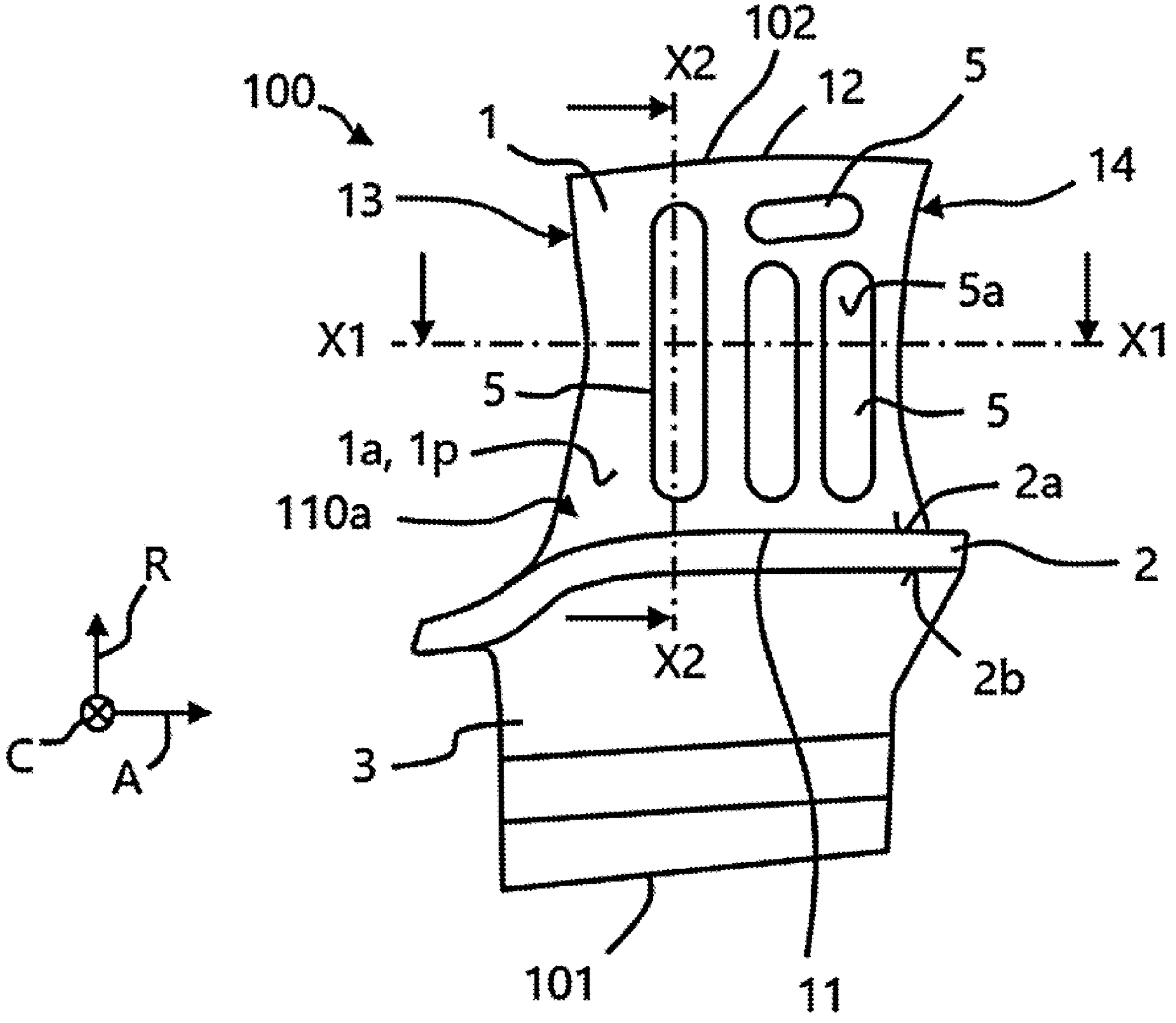
FIG. 6 schematically illustrates a side view of a turbine blade according to a further embodiment of the invention.

As shown in FIG. 2, the blade assembly 200 includes multiple blades 100. FIG. 3 exemplarily shows a cross-sectional view of a blade 100. FIG. 6 shows a blade 100 in a side view. As shown in FIGS. 2 and 6, each blade 100 may include an airfoil 1, a platform 2, and a root 3.

The airfoil 1 may extend along radial or span direction R between a platform end 11 and a tip end 12. With regard to an axial or chord direction A, that extends transverse to the radial direction, the airfoil 1 may extend between a leading edge 13 and a trailing edge 14. An outer surface 1*a* of the airfoil 1, between the leading edge 13 and the trailing edge 14, may define a pressure side surface 1*p* and a suction side surface Is being oriented opposite to the pressure side surface 1*p*.

As schematically shown in FIG. 2, the platform 2 may be a substantially plate shaped structure having an expanse with respect to the axial direction A and with respect to a circumferential direction C. The circumferential direction C extends transverse to the axial direction A and to the radial direction A. The platform 2 is coupled to the platform end 11 of the airfoil 1 and may protrude from the airfoil 1 with respect to the circumferential direction C. As depicted by way of example in FIG. 2, the platform 2 may include an upper surface 2*a* oriented towards the tip end 12 of the airfoil 1 and a lower surface 2*b* oriented opposite to the upper surface 2*a*. Further, the platform 2 may have an end face 2*c* connecting the upper and lower surfaces 2*a*, 2*b* and being oriented in the circumferential direction C.

The outer surface 1*a* of the airfoil 1, in particular, the pressure side surface 1*p* and the suction side surface 1*s*, each may be connected to the upper surface 2*a* of the platform 2 via a transition surface 2*t*. As exemplarily shown in FIG. 2, the transition surface 2*t* may be a concave curved surface.

The root 3 is connected to the lower surface 2*b* of the platform 2 and protrudes from the lower surface 2*b* of the platform 2 along the radial direction R. As exemplarily shown in FIG. 2, the root 3 may include a firtree shaped cross-section. Generally, the coupling interfaces 230 of the rotor disk 210 and the roots 3 of the blades 100 may have complementary cross-sections. As shown in FIG. 2, the roots 3 and the coupling interfaces 230 are interconnected, i.e., they are engaged and interlocked with each other.

Hence, generally, the blade 100 extends in the radial direction R between a root end 101, e.g., an end of the root 3 facing away from the airfoil 1, and a tip end 102, e.g., the tip end 12 of the airfoil 1. The airfoil 1, the platform 2, and, optionally, the root 3 form a blade body 110. An outer surface 110*a* of the blade body 110 is formed by the outer surface 1*a* of the airfoil 1, the transition surface 2*t*, the upper and lower surfaces 2*a*, 2*b* and the end face 2*c* of the platform 2, and, optionally, an outer surface of the root 3.

As shown in FIG. 3, the blade body 110, in particular, the airfoil 1, may comprise an inner cavity or void 115. The inner cavity 115 is limited by an inner surface 110*i* of the blade body 110 and serves as a reservoir for receiving a gaseous cooling fluid, e.g., compressed air bleed from the compressor 310. A wall thickness W of the blade body 110 is measured from the inner surface 110*i* to the outer surface 110*a* of the blade body 110.

Figure 4:
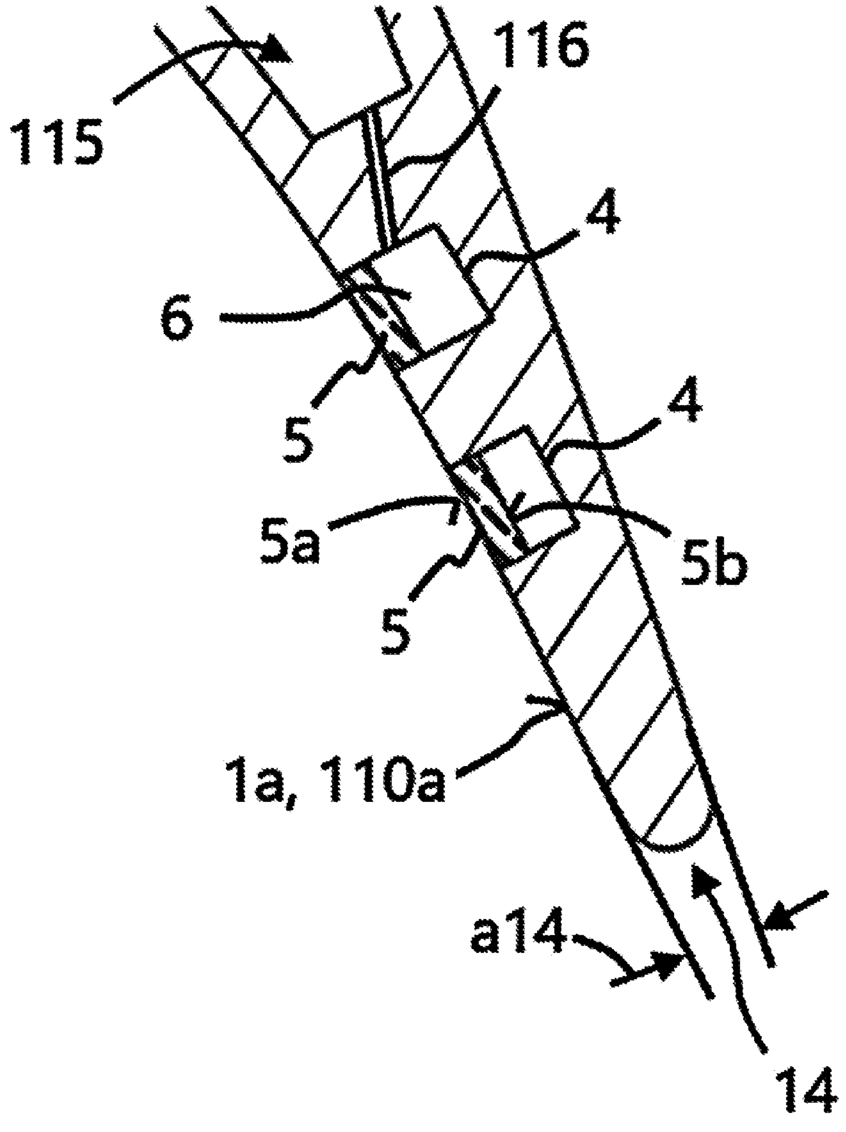
FIG. 4 shows a detailed view of the area marked by letter Z in FIG. 3
Figure 5:
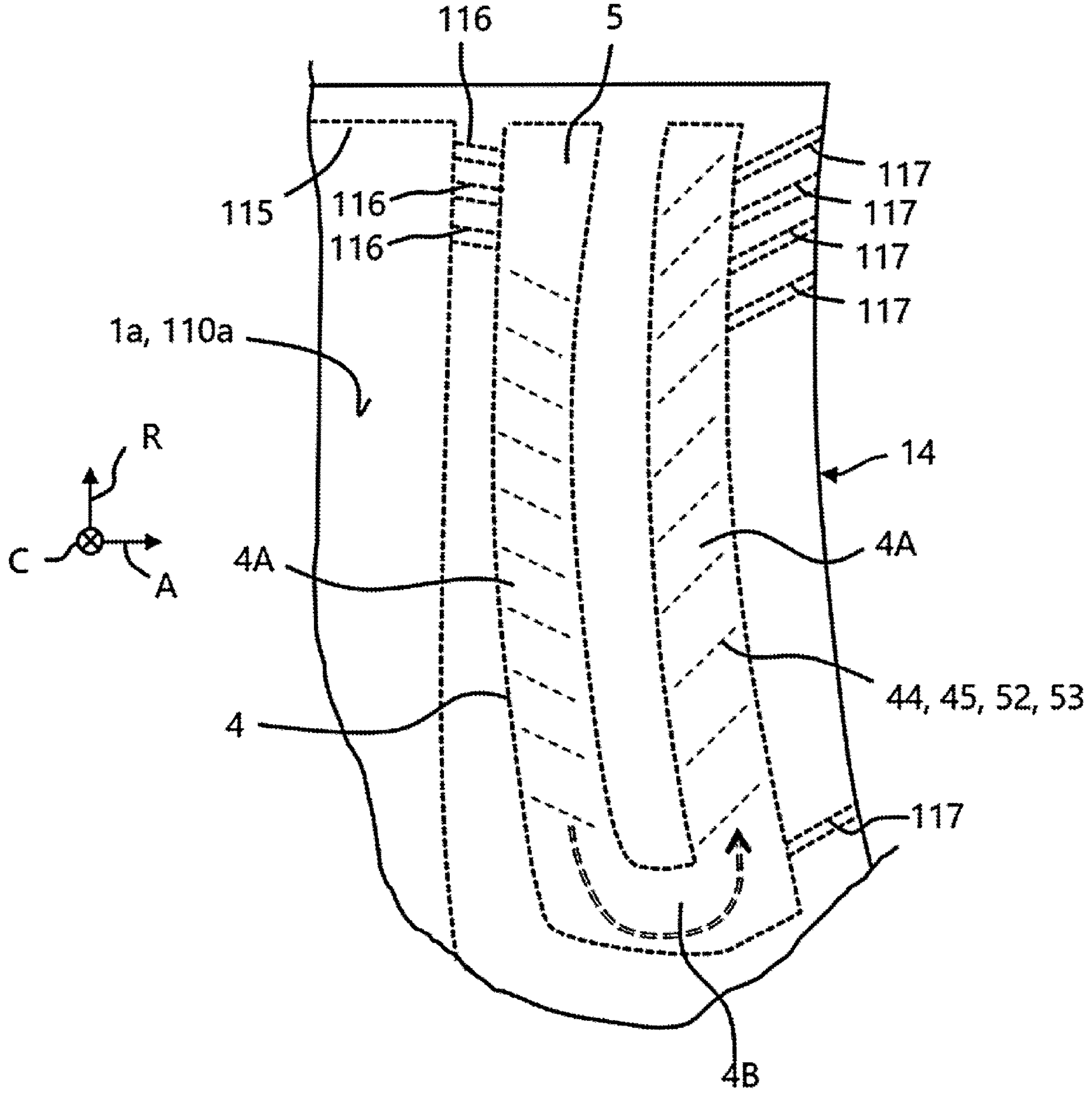
FIG. 5 schematically illustrates a side view of the blade shown in FIG. 3.

As further shown in FIG. 3, the blade body 110 includes a groove 4 formed in the outer surface 110*a* of the blade body 110, and a cover 5 covering the groove 4. FIG. 4 shows a detailed view of a portion of the blade body 110 of FIG. 3 in the region of the trailing edge 14. FIG. 5 shows a side view of the blade body 110 of FIG. 3 when viewed in the viewing direction V depicted in FIG. 3.

FIG. 3, by way of example only, shows that the groove 4 may be formed in the pressure side surface 1*p* of the airfoil 1 in a region adjacent to the trailing edge 14. The invention, however, is not limited thereto. As schematically shown in FIGS. 3 and 6, one or more grooves 4 may be provided also in regions of the airfoil 1 spaced from the trailing edge 14. FIG. 6 exemplarily shows that grooves 4 are provided on the pressure side surface 1*p* of the airfoil 1. Additionally, or alternatively, it is also possible to provide a groove 4 in the platform 2, e.g., in the upper or lower surface 2*a*, 2*b* of the platform 2. It should be understood that one or more grooves 4 can also be formed in the suction side surface Is of the airfoil 1. Generally, at least one groove 4 is formed in the outer surface 110*a* of the blade body 110.

Figure 7:
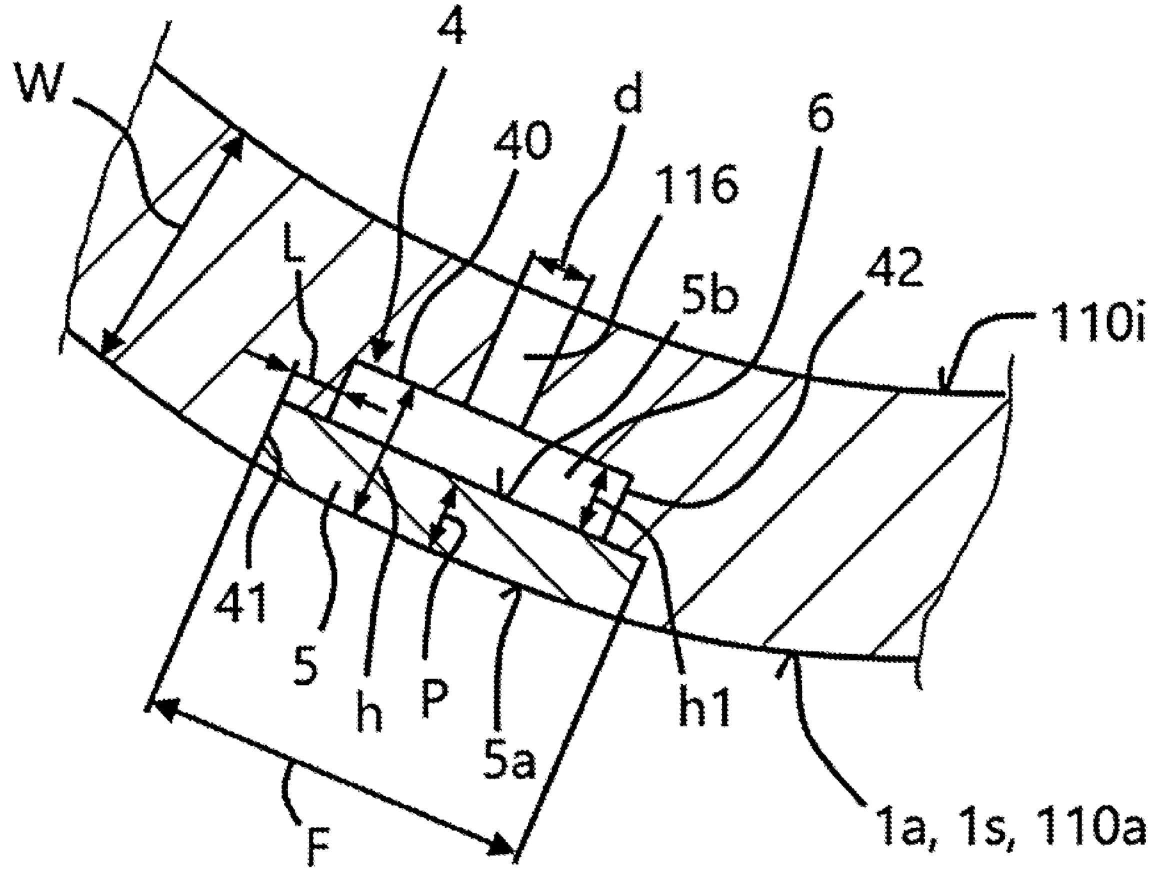
FIG. 7 shows a schematic cross-sectional view of the blade of FIG. 6 taken along line X1-X1 in FIG. 6.

FIGS. 7 to 11 show cross-sectional views of grooves 4 formed in the outer surface 110*a* of the blade body 110. Generally, the groove 4 may include a bottom 40 and opposite side walls 41, 42 connecting the bottom 40 and the outer surface 110*a* of the blade body 110. As exemplarily shown in FIGS. 3, 4, and 9, the groove 4 may have a generally rectangular cross-section. However, the invention is not limited thereto. As schematically shown in FIG. 7, the groove 4 may also have a polygonal cross-section, or a trapezoidal cross-section, as exemplarily shown in FIG. 10.

Figure 11:
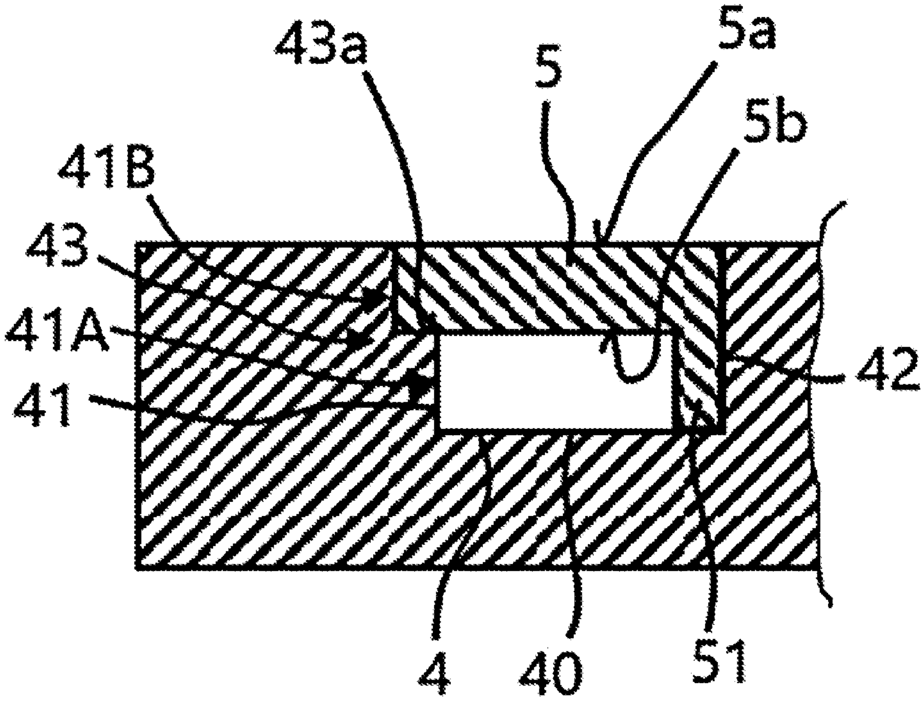
FIG. 11 schematically illustrates a partial cross-sectional view of a turbine blade according to a further embodiment of the invention.

Optionally, the groove 4 may include a support 43. The support 43, generally, defines a support surface 43*a* which is oriented such that a normal vector to the support surface 43*a* has a component perpendicular to a region of the outer surface 110*a* of the blade body 110 adjacent to the groove 4. FIGS. 7 and 11, by way of example, show a groove 4 which support 43 is formed by a step in at least one of the sidewalls 41, 42 of the groove 4. In FIG. 7, both sidewalls 41, 42 include a step. In FIG. 11, only sidewall 41 includes a step. As visible best in FIG. 11, the sidewall 41 may comprise a first portion 41A extending from the bottom 40 of the groove 4 and a second portion 41B extending from the outer surface 110*a* of the blade body 110. The second portion 41B is laterally spaced to the first portion 41A in a direction perpendicular to the sidewalls 41, 42. A step portion with a step surface forming the support surface 43*a* extends between and connects the first and second portions 41A, 41B of the sidewall 41. As exemplarily shown in FIG. 11, optionally, the support surface 43*a* defined by the step may extend parallel to the region of the outer surface 110*a* of the blade body 110 adjacent to the groove 4. However, the invention is no limited thereto.

Figure 10:
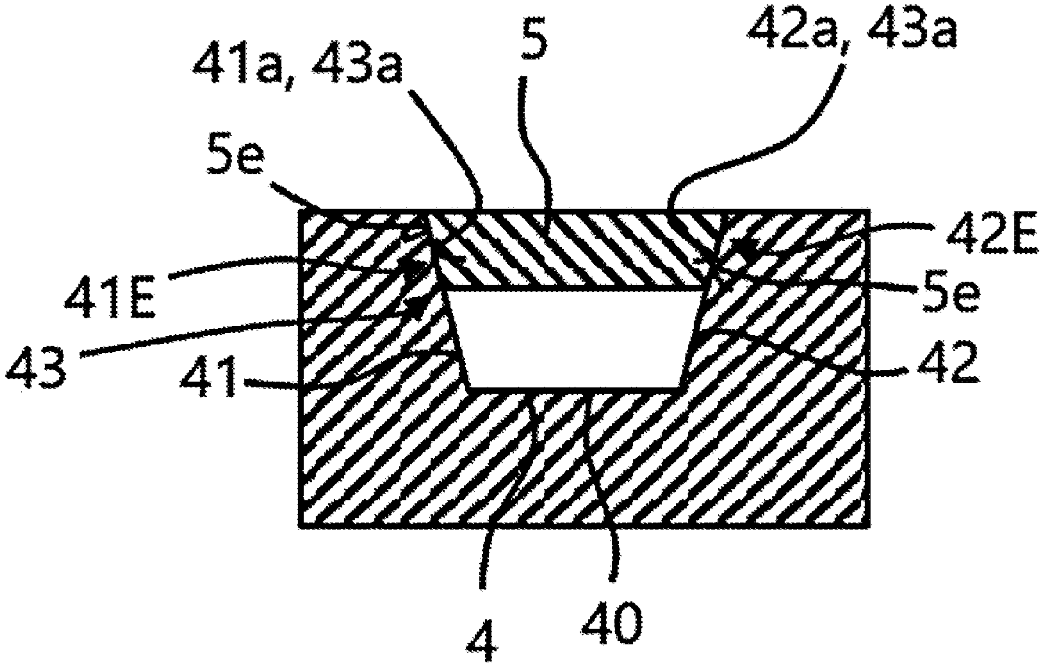
FIG. 10 schematically illustrates a partial cross-sectional view of a turbine blade according to a further embodiment of the invention.

Alternatively to a step, the optional support 43 of the groove 4 may be formed by respective tapering end portions 41E, 42E of the opposing sidewalls 41, 42 of the groove 4, as exemplarily shown in FIG. 10. As depicted in FIG. 10, the support surface 43*a* may be formed by a surface 41*a*, 42*a* of an end portion 41E, 42E of each sidewall 41, 42. The end portions 41E, 42E are positioned facing away from the bottom 40 of the groove 4. FIG. 10 exemplarily shows that the sidewalls 41, 42 as a whole extend inclined relative to each other and come closer to each other towards the bottom 40 of the groove 4. Generally, the surfaces 41*a*, 42*a* of the sidewalls 41, 42, at least in the end portions 41E, 42E, may define a cross-section of the groove 4 that tappers towards a bottom 40 of the groove. As apparent from FIG. 10, also in this configuration, the support surface 43*a* is oriented such that a normal vector to the support surface 43*a* has a component perpendicular to a region of the outer surface 110*a* of the blade body 110 adjacent to the groove 4.

Figure 8:
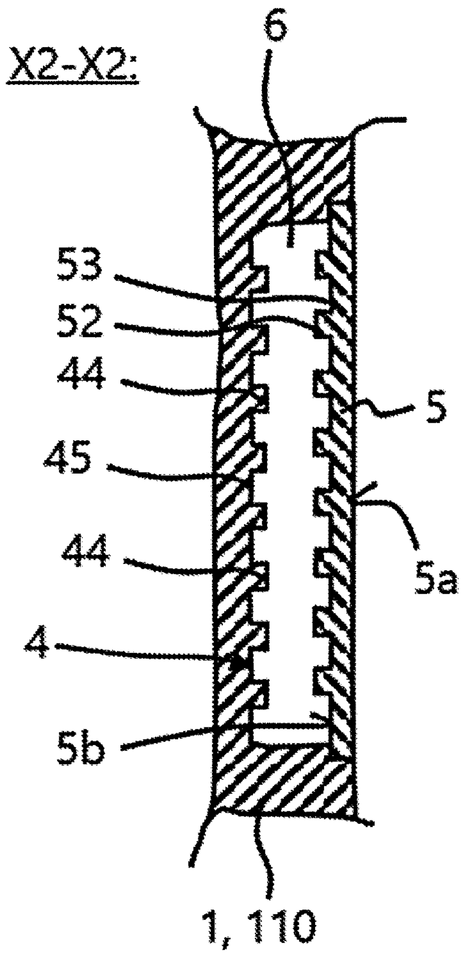
FIG. 8 shows a schematic cross-sectional view of the blade of FIG. 6 taken along line X2-X2 in FIG. 6.

As shown in FIG. 8, the groove 4, in particular, the bottom 40 of the groove 4 may be formed with at least one of projections 44 and recesses 45.

As shown in FIGS. 3 and 4, the inner cavity 115 may be in fluid communication with the groove 4 via a fluid passage 116 extending between the cavity 115 and the groove 4. As shown schematically in FIG. 5, multiple passages 116, e.g., in the form of holes, may be provided.

The dimensions of the groove 4 are schematically illustrated in FIG. 7. A depth h of the groove 4 is measured from the outer surface 110*a* of the blade body 110 to a bottom 40 of the groove 4. The wall thickness W of the blade body 110 may lie within a range between 1.5 and 4 times, optionally, between 1.5 and 2 times, of the depth h of the groove 4. A width F of the groove 4, measured between the opposing sidewalls 41, 42 at the outer surface 110*a* of the blade 110 may lie in a range between 0.2 to 10 times of the wall thickness W, in particular, in a range between 1 to 3 times of the wall thickness W. If the support 43 is provided as a step, a depth h1 of the first portion 41A of the side wall 41 may be in a range between 1 to 6 times, in particular, 1.5 to 3 times of a diameter d of the fluid passage 116.

As shown in FIG. 5, the groove 4 may extend meandering on the outer surface 110*a* of the blade body 110. For example, the groove 4 may have first sections 4A that extend substantially along the radial direction R and/or substantially parallel to the trailing edge 14 on the outer surface 1*a* of the airfoil 1, and one or more second sections 4B, wherein one second section 4B connects two first sections 4A. Additionally, or alternatively, it is also possible that the groove 4 extends generally straight, as exemplarily shown in FIG. 6.

The groove 4 may be connected to the outer surface 110*a* of the blade body 110 by one or more outlet passages 117 extending between the groove 4 and the outer surface 110*a* of the blade body 110. For example, a plurality of outlet passages 117 may extend between the trailing edge 117 and the groove 4, as schematically shown in FIG. 5.

The cover 5 is a part separate from the blade body 110 but joined to the blade body 110, for example, by brazing, diffusion bonding, or welding, or another material bonding method. The cover 5 is positioned on the blade body 110 such that it covers the groove 4 and such that the cover 5 and the groove 4, together, define a cooling channel 6. Hence, for cooling the outer surface 110*a* of the blade body 110, the cooling fluid received in the cavity 115 enters the cooling channel 6 via the one or more passages 116 and flows through the cooling channel 6 where it receives heat from the cover 5 and the walls 40, 41, 42 of the groove 4. Finally, the cooling fluid is discharged to the outer surface 110*a* of the blade body 110 through the outlet passages 117. As schematically shown in FIGS. 3, 4 and 5, the passages 116 may extend inclined relative to the cover 5 and so that a central axis of the passage 116 intersects the cover 5. Thereby, the cooling fluid discharged into the channel 6 impinges to the cover which further promotes heat transfer via the cover 5. It should be noted that, alternatively to multiple, inclined passages as shown in FIG. 5, one single passage 116 of larger diameter may be provided. In this case, an impingement effect is reduced or not present. Instead, heat transfer via the cover 5 is promoted via convective cooling by the fluid flowing in the channel 6.

The cover 5 is a plate or strip shaped part comprising an outer surface 5*a* and an opposite inner surface 5*b*. When positioned on the blade body 110, the inner surface 5*b* of the cover 5 faces the groove 4, in particular, the outer surface 5*a* is positioned to be substantially flush with the outer surface 110*a* of the blade body 110 as exemplarily shown in FIGS. 4 and 7 to 11. Generally, the cover 5 may be positioned within the groove 4 and so that the outer surface 5*a* of the cover 5 and the outer surface 110*a* of the blade body 110 form a continuous surface. As exemplarily shown in FIGS. 7 and 11, the inner surface 5*b* of the cover 5 may be in contact with or supported by the support surface 43*a* of the support 43 of the groove 4. If the support 43 is formed by tapering surfaces 41*a*, 42*a* of the sidewalls 41, 42 of the groove 4, as shown in FIG. 10, opposite end faces 5*e* that connect the inner and outer surface 5*a*, 5*b* of the cover 5 may be in contact with and supported by those tapering surfaces 41*a*, 42*a* forming the support surface 43.

The cover 5 may have a thickness P, measured between the inner and the outer surface 5*a*, 5*b*, in a range between 0.5 mm and 2.0 mm, preferably between 0.8 mm and 1.2 mm. Hence, the cover 5 may have a very small wall thickness P which promotes heat transfer between the inner and the outer surface 5*a*, 5*b*. Further, thermally introduced stress is reduced due to the small thickness P of the cover 5 resulting in a decreased temperature difference across the cover 5. Referring again to FIG. 7, the depth h of the groove 4 may be within a range of 1.5 to 5 times, in particular, 1.7 to 2.5 times of the thickness P of the cover 5. A width L of the support surface 43*a*, measured perpendicular to the spacing direction of the sidewalls 41, 42 of the groove 4 may be in a range between 0 to 1.5, in particular, between 0 to 0.5 of the thickness P of the cover 5.

As exemplarily shown in FIG. 8, the inner surface 5*b* of the cover 5, optionally, may be formed with at least one of projections 52 and recesses 53.

Additionally or alternatively to providing the groove 4 with a support 43, the cover 5 may include a spacer 51 protruding from the inner surface 5*b* of the cover 5, as schematically shown in FIG. 11. As shown in FIG. 11, the spacer 51 extends into the groove 4 and contacts the bottom 40 of the groove 4 to hold the outer surface 5*a*. Alternatively, it would also be possible that the spacer 51 contacts a support surface 43*a*, if provided.

Figure 9:
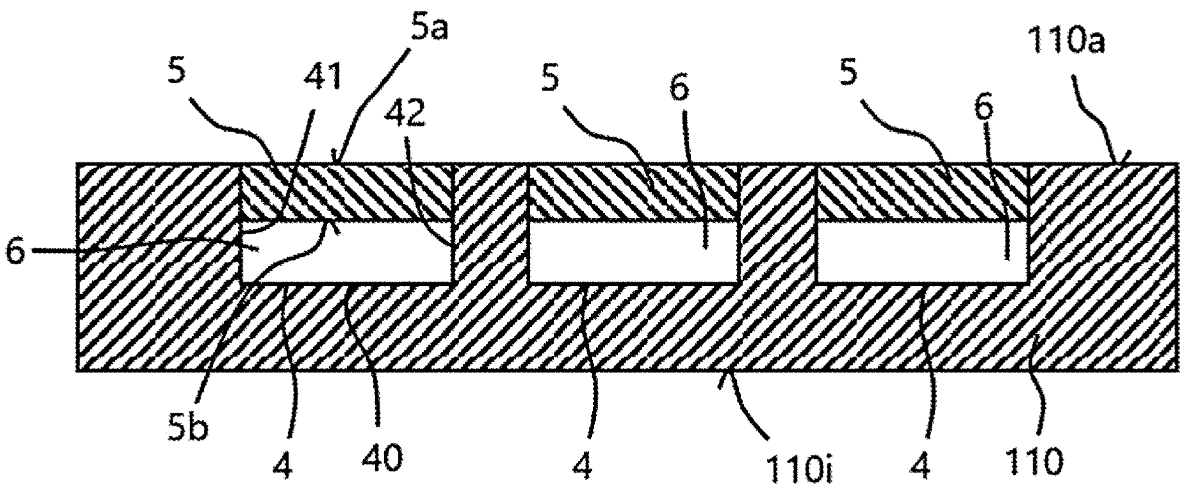
FIG. 9 schematically illustrates a partial cross-sectional view of a turbine blade according to a further embodiment of the invention.

Although configurations with a support 43 and/or a spacer 51 have been discussed above, the invention is not limited to such configurations. FIG. 9, by way of example, schematically shows a blade body 110 which groove 4 has straight sidewalls 41, 42, and the cover 5 extends between the sidewalls 41, 42 without being supported by a spacer 51 or a support 43.

As shown in FIG. 5, the cover 5, optionally, may be a single continuous part covering the groove 4 at its complete extent. Alternatively, multiple covers 5 may be positioned adjacent along the extent of the groove 4 to cover the groove 4. Generally, the cover 5 may be adapted to the course and extent of the groove 4. The cover 5 is made of a metal material, e.g. a Nickel or Cobalt based high temperature alloy, in particular, an alloy suitable for additive manufacturing. For example, IN792SX, CM247LC, Hastelloy-X, Haynes 230 or similar may be used.

Figure 12:
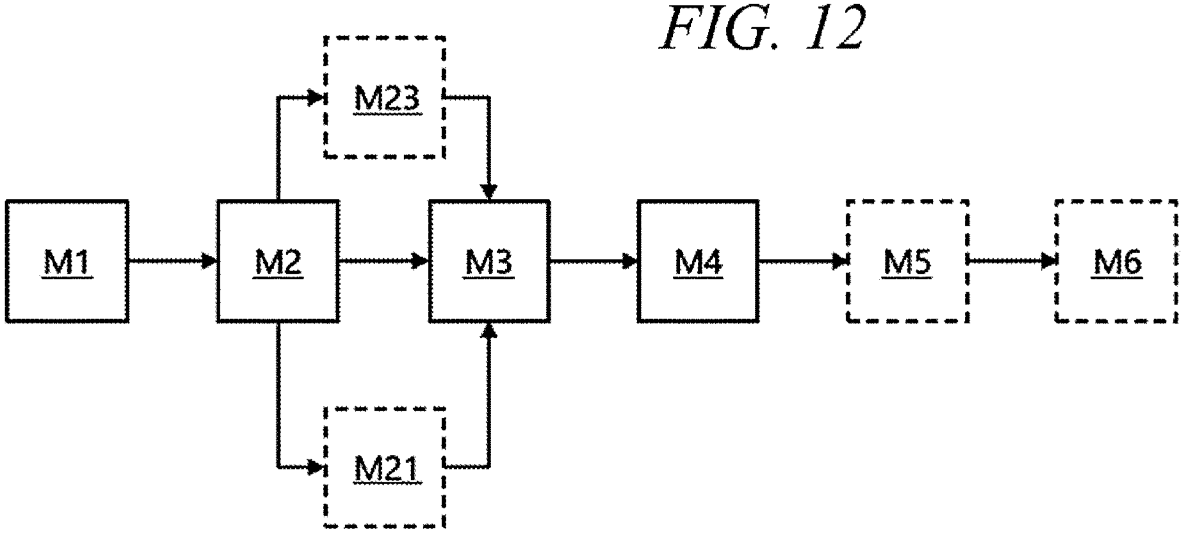
FIG. 12 illustrates a flowchart of a method for manufacturing a blade of a turbine according to an embodiment of the invention.

FIG. 12 shows a flowchart of a method M for manufacturing a blade 100 for a gas turbine 300. The method M may be used to manufacture one of the blades 100 described above. Therefore, the method M, by way of example, will be explained referring to the blades 100 discussed above.

In step M1, the blade body 110 is formed. This may, hence, include forming the airfoil 1, the platform 2, and the root 3. Step M1 may include casting the blade body 110, e.g., in a conventionally cast (CC), a directionally solidified (DS), or single crystal (SX) cast process. The blade body 110 may be made of a Nickel or Cobalt based high temperature alloy, such as, e.g., IN792SX, CM247LC, or similar.

Step M2 includes forming the groove 4 in the outer surface 110*a* of the blade body 110, e.g., in the airfoil 1 or in the platform 2. Step M2 may form part of step M1. That is, the groove 4 may be formed, for example, in the casting process in which the blade body 110 is generated. In this case, the groove 4, optionally may be post processed with an subtractive method, such as grinding, for example, to adapt surface quality to the desired needs. Alternatively, the blade body 110 may be generated in step M1 with a continuous, closed outer surface 110*a*, and the groove 4 may be formed in step M2 subsequently by applying a subtractive manufacturing process, such as milling, grinding, die sinking, etching or similar, to the outer surface 110*a* of the blade body 110, that is, after forming the blade body 110. In step M2, the optional protrusions 44 and/or recesses 45 may be formed in the groove 4.

In optional step M21, the fluid passage or passages 116 between the inner cavity 115 and the groove 4 may be formed. In step M21, if provided, also the outlet passage 117 may be formed. It is to be noted that forming the respective passage 116, 117 may include drilling a hole or otherwise generating a passage between the groove 4 and the cavity 115 or the groove and the outer surface 110*a* in an subtractive process. Alternatively, the respective passage 116, 117 may be generated in step M1 of forming the blade body 110, i.e., in the casting process.

In optional step M23, a removable spacing structure (not shown) is introduced into the groove 4. The spacing structure may be a framework of a material that can be melted or thermally destroyed in a temperature range in which the structural properties of blade body 110 and the cover 5 are not affected, or of a material that can be chemically dissolved or destroyed by a liquid or gaseous agent. For example, the spacing structure may be made of a thermoplastic material, a starch based material or similar.

In step M3, the cover 5 is positioned on the blade body 110 such that it covers the groove 4 and such that the outer surface 5*a* of the cover 5 and the outer surface 110*a* of the blade body 110 form a continuous surface. Generally, as explained above, the cover 5 may be introduced into the groove 4. If provided, the cover 5 may be placed in contact with the optional support surface 43*a*. Additionally, or alternatively, the spacer 51 of the cover 5 may be placed in contact with the bottom 40 or the support surface 43*a* of the groove 4. If provided, the cover 5 may be placed, additionally, or alternatively, on the spacing structure. After positioning the cover 5 in the groove 4, the inner surface 5*b* of the cover 5 faces the bottom 40 of the groove 4.

In step M4, the cover 5 is joined to the blade body 110 so that the cover 5 and the groove 4 define the cooling channel 6. Generally, joining the cover 5 to the blade body 110 may include material bonding. For example, the cover 4 and the blade body may be brazed together, diffusion bonded to each other, or welded together. Welding, for example, may include laser welding, arc welding, or electron beam welding. After joining, optionally, the outer surface 5*a* of the cover may be treated, e.g. in a subtractive process, so that it is matched with the outer surface 110*a* of the blade body 110. In particular, material of the cover 5 protruding over the outer surface 110*a* of the blade body 110 may be removed and/or a surface roughness of the outer surfaces 5*a*, 110*a* of the cover 5 and/or the blade body 110 may be adjusted.

In optional step M5, if provided, the spacing structure (not shown), may be removed thermally or chemically from the channel 6. This may include heating the blade to a temperature sufficient to melt or destroy the support structure and purge the support structure from the channel 6. Alternatively, a solving agent may be introduced into the channel 6 to dissolve or otherwise chemically remove the support structure.

In a further optional step M6, one or more coating layers (not shown) may be applied to the outer surface of the blade 100, formed by the outer surface 110*a* of the blade body 110 and the outer surface 5*a* of the cover. This may include, for example, applying a coating to the outer surface of the blade 100. For example, a MCrAlY material or other suitable material as bondcoat may be applied by a low pressure plasma spray (LPPS), a vacuum plasma spray (VPS), an air plasma spray (APS), or high velocity oxy fuel (HVOF) process. The letter "M" in "MCrAlY" is a placeholder for Co, Ni, or NiCo. Additionally, a topcoat may be applied to the coating. For example, a single or multi-layered ceramic, e.g., Yttrium stabilized zirconium (YSZ), may be applied by LPPS or APS.

Since the cover 5 is provided as a separate component which is joined to the blade body 110 after generating the blade body 110, a thin wall thickness, defined by the thickness P of the cover 5, between the cooling channel 6 and the outer surface 5*a*, 110*a* of the blade 100 can be realized. Thereby, the temperature difference across the cover 5 and, hence, stress within the cover 5 is reduced. This helps to increase lifetime of the blade 100. Due to the reduced wall thickness P of the cover 5, heat transfer between the outer surface 5*a*, 110*a* of the blade 100 and the cooling fluid flowing in the channel 5 is increased. Hence, lower mass flow rates of cooling fluid are necessary to achieve a given cooling rate. This helps to improve the overall efficiency of the gas turbine 300 because less compressed air has to be bleed from the compressor 310 for cooling purposes. Further, manufacturing of the blade 100 is eased since complicated and failure prone cores for defining a closed channel beneath the outer surface of the blade 100 can be omitted.

Moreover, if the groove 4 is formed adjacent to the trailing edge 14, separately providing the cover 5 and joining it to the blade body 110 helps to shift the cooling channel 6 closer to the trailing edge 14. On the other hand, since the cover 5 is dimensioned quite thin, the blade body 110 can be formed thin, too, in the region adjacent to the trailing edge 14. Hence, low wedge angles a14 can be realized easier at the trailing edge 14 (FIG. 4). Thereby, freedom of design is increased.

Although specific embodiments have been illustrated and described herein, it will be appreciated by those of at least ordinary skill in the art that a variety of alternate and/or equivalent implementations exist. It should be appreciated that the exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

What is claimed is:

1. A method for manufacturing a blade for a gas turbine, the method comprising:

forming a blade body;

forming a groove in an outer surface of the blade body;

positioning a cover on the blade body such that it covers the groove and such that an outer surface of the cover forms a continuous surface with the outer surface of the blade body; and joining the cover to the blade body so that the cover and the groove define a cooling channel, wherein the cover includes a spacer protruding from an inner surface of the cover, and wherein positioning the cover on the blade body includes introducing the spacer into the groove so that the spacer contacts a bottom or a support surface of the groove to hold the outer surface of the cover in a position in which it forms a continuous surface with the outer surface of the blade body.

2. The method of claim 1, wherein forming the blade body includes casting the blade body.

3. The method of claim 1, wherein the groove is formed in the step of forming the blade body, or wherein the groove is formed by applying an subtractive manufacturing process to the outer surface of the blade body after forming the blade body.

4. The method of claim 1, wherein the blade body is formed to have an inner surface defining an inner cavity or void, wherein a wall thickness of the blade body is measured from the inner surface to the outer surface of the blade body.

5. The method of claim 4, wherein the wall thickness is within a range between 1.5 and 4 times of a depth of the groove measured from the outer surface of the blade body to a bottom of the groove.

6. The method of claim 4, further including forming a fluid passage extending between the cavity and the groove.

7. The method of claim 1, wherein the groove is formed with a support defining a support surface being oriented such that a normal vector to the support surface has a component perpendicular to a region of the outer surface of the blade body adjacent to the groove.

8. The method of claim 7, wherein:

the support is formed by a step in a sidewall of the groove, the support surface connecting two laterally spaced portions of the sidewall; or the support is formed by respective end portions of opposing sidewalls of the groove, wherein the support surface is formed by a surface of each sidewall, wherein the surfaces of the sidewalls, at least in the end portions, define a cross-section of the groove that tapers towards a bottom of the groove.

9. The method of claim 1, further comprising:

introducing a spacing structure into the groove, wherein positioning the cover on the blade body includes positioning the cover on the spacing structure so that the spacing structure holds the cover in a position in which the outer surface of the cover forms a continuous surface with the outer surface of the blade body; and thermally or chemically removing the spacing structure after joining the cover to the blade body.

10. The method of claim 1, wherein the cover has a thickness in a range between 0.5 mm and 2.0 mm.

11. The method of claim 1, wherein joining the cover to the blade body includes material bonding.

12. The method of claim 1, wherein at least one of the groove and an inner surface of the cover is formed with at least one of projections and recesses.

13. A blade for a gas turbine, comprising:

a blade body having an outer surface in which a groove is formed; and a cover positioned such that it covers the groove and such that an outer surface of the cover forms a continuous surface with the outer surface of the blade body, wherein the cover includes a spacer protruding from an inner surface of the cover, and positioning the cover on the blade body includes introducing the spacer into the groove, wherein the cover is joined to the blade body, and wherein the cover and the groove define a cooling channel.

14. The blade of claim 13, wherein the blade body has an inner surface defining an inner cavity or void, wherein a wall thickness of the blade body is measured from the inner surface to the outer surface of the blade body, wherein the wall thickness is within a range between 1.5 and 4 times of a depth of the groove measured from the outer surface of the blade body to a bottom of the groove.

15. The blade of claim 14, a fluid passage is formed that extends between the cavity and the groove.

16. The blade of claim 13, wherein the groove is formed with a support defining a support surface being oriented such that a normal vector to the support surface has a component perpendicular to a region of the outer surface of the blade body adjacent to the groove.

17. The blade of claim 16, wherein:

the support is formed by a step in a sidewall of the groove, the support surface connecting two laterally spaced portions of the sidewall.

18. The blade of claim 16, wherein:

the support is formed by respective end portions of opposing sidewalls of the groove, wherein the support surface is formed by a surface of each sidewall, wherein the surfaces of the sidewalls, at least in the end portions, define a cross-section of the groove that tapers towards a bottom of the groove.

19. A blade for a gas turbine, comprising:

a blade body having an outer surface in which a groove is formed; and a cover positioned such that it covers the groove and such that an outer surface of the cover forms a continuous surface with the outer surface of the blade body, wherein the cover is joined to the blade body, wherein the cover and the groove define a cooling channel, wherein the groove is formed with a support defining a support surface being oriented such that a normal vector to the support surface has a component perpendicular to a region of the outer surface of the blade body adjacent to the groove, wherein the support surface is formed by respective end portions of opposing sidewalls of the groove, and wherein the surface of each sidewall extends towards the other from the outer surface of the blade body toward a bottom of the groove.

* * * * *